(12) United States Patent
Rahman

(10) Patent No.: US 7,218,630 B1
(45) Date of Patent: May 15, 2007

(54) DATA SESSION SETUP SYSTEM FOR WIRELESS NETWORK

(75) Inventor: Mohamed Anisur Rahman, Randolph, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/303,343

(22) Filed: Apr. 30, 1999

(51) Int. Cl.
*H04L 12/66* (2006.01)

(52) U.S. Cl. .............. 370/355; 370/352; 455/556.1; 455/15

(58) Field of Classification Search ........... 370/328, 370/329, 338, 352, 353, 354, 355, 356, 357, 370/358, 400, 401, 465, 466
See application file for complete search history.

(56) References Cited

U.S. PATENT DOCUMENTS

| | | | |
|---|---|---|---|
| 5,533,019 A * | 7/1996 | Jayapalan ................... | 370/352 |
| 5,590,133 A * | 12/1996 | Billstrom et al. ........... | 370/349 |
| 5,602,546 A * | 2/1997 | Andrea ...................... | 341/51 |
| 5,793,762 A * | 8/1998 | Penners et al. ............. | 370/389 |
| 5,802,465 A * | 9/1998 | Hamalainen et al. ....... | 455/403 |
| 5,956,331 A * | 9/1999 | Rautiola et al. ............ | 370/338 |
| 5,963,860 A * | 10/1999 | Muths et al. ............. | 455/412.1 |
| 6,041,048 A * | 3/2000 | Erickson et al. ............ | 370/349 |
| 6,219,343 B1 * | 4/2001 | Honkasalo et al. ......... | 370/335 |
| 6,219,346 B1 * | 4/2001 | Maxemchuk ............... | 370/338 |
| 6,243,367 B1 * | 6/2001 | Hussain ....................... | 370/329 |
| 6,301,480 B1 * | 10/2001 | Kennedy et al. ............ | 455/445 |
| 6,317,609 B1 * | 11/2001 | Alperovich et al. ..... | 455/556.1 |
| 6,320,873 B1 * | 11/2001 | Nevo et al. .................. | 370/466 |
| 6,377,790 B1 * | 4/2002 | Ishii ........................... | 455/343 |
| 6,400,712 B1 * | 6/2002 | Phillips ...................... | 370/355 |
| 6,515,989 B1 * | 2/2003 | Ronneke ..................... | 370/389 |

(Continued)

FOREIGN PATENT DOCUMENTS

WO  WO 99/17579  9/1998

OTHER PUBLICATIONS

John Heidemann, Katia Obraczka, and Joe Touch, "Modeling The Performance of HTTP Over Several Transport Protocols," IEEE/ACM Transactions on Networking, vol. 5, No. 5, Oct. 1997, pp. 616-630.

*Primary Examiner*—Chi Pham
*Assistant Examiner*—Phuc Tran

(57) ABSTRACT

A wireless communication system uses a circuit switched link between a wireless unit and a base station to establish a data session with a network device in a packet data network. After the data session is established, the data session can proceed using a packet switched link between the wireless unit and the base station. By using the circuit switched link to send data session setup packets, the system avoids the delay associated with requesting and being allocated wireless resources in sending the setup packets using the packet switched link. Decreasing the delay associated with setting up the data session improves the data rate and throughput between the wireless communications system and the packet data network. For example, in an exemplary CDMA system, a circuit switched link is established to carry primary traffic (such as voice) and secondary traffic. The setup packets for the data session can be directly sent as secondary traffic on the circuit switched link, thereby avoiding the delay associated with sending the setup packets over a packet switched link. In this way, the round trip time (RTT) associated with setting up the data session can be reduced to improve the overall data rate and throughput through the wireless network to the packet data network.

10 Claims, 6 Drawing Sheets

U.S. PATENT DOCUMENTS

| | | | |
|---|---|---|---|
| 6,519,233 B1 * | 2/2003 | Gutierrez | 370/320 |
| 6,560,239 B1 * | 5/2003 | Frid et al. | 370/426 |
| 6,560,457 B1 * | 5/2003 | Silver et al. | 455/445 |
| 6,608,832 B2 * | 8/2003 | Forslow | 370/353 |
| 6,628,943 B1 * | 9/2003 | Agrawal et al. | 455/432.1 |

* cited by examiner

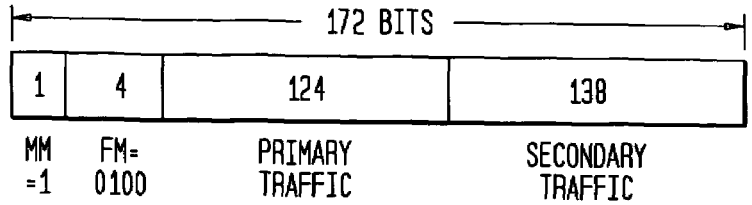

FIG. 5A — 14400 bps DIM AND BURST WITH RATE 1/2 PRIMARY AND SECONDARY TRAFFIC

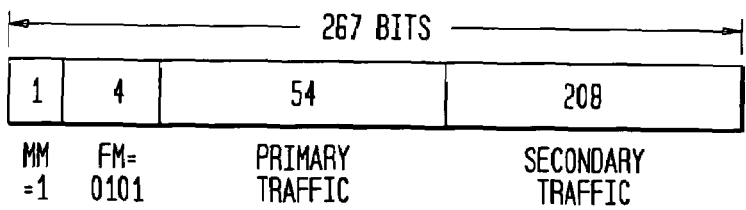

FIG. 5B — 14400 bps DIM AND BURST WITH RATE 1/4 PRIMARY AND SECONDARY TRAFFIC

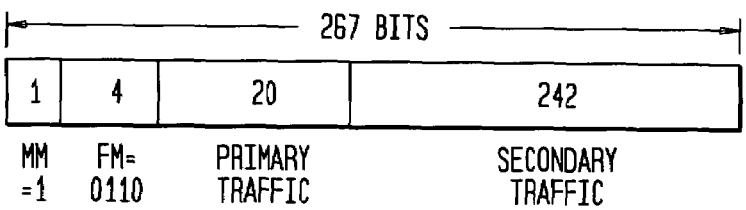

FIG. 5C — 14400 bps DIM AND BURST WITH RATE 1/8 PRIMARY AND SECONDARY TRAFFIC

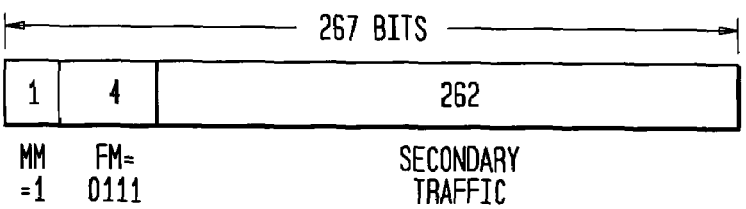

FIG. 5D — 14400 bps BLANK AND BURST WITH SECONDARY TRAFFIC ONLY

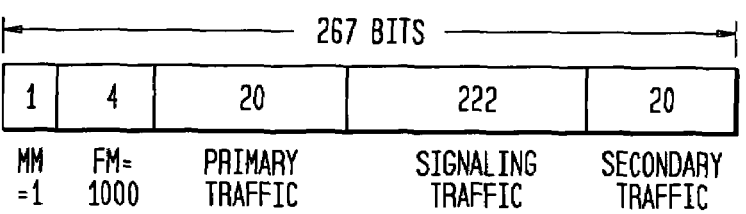

FIG. 5E — 14400 bps DIM AND BURST WITH RATE 1/8 PRIMARY, SECONDARY & SIGNALING TRAFFIC

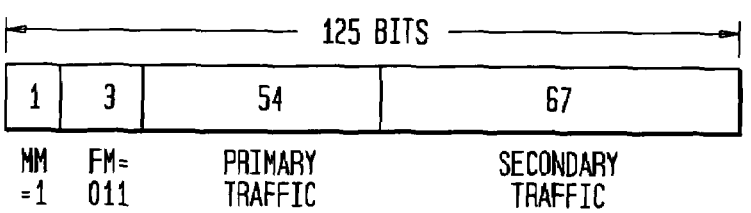

FIG. 5F — 7200 bps DIM AND BURST WITH RATE 1/4 PRIMARY AND SECONDARY TRAFFIC

NOTATION: MM - MIXED MODE BIT    FM - FRAME MODE BITS

DATA SESSION SETUP SYSTEM FOR WIRELESS NETWORK

BACKGROUND OF THE INVENTION

1. Field of the Invention

This invention relates to wireless communications and, more particularly, to a data session setup system for a wireless network.

2. Description of Related Art

Wireless communications systems include conventional cellular telephone systems which comprise a number of cell sites or base stations, geographically distributed to support transmission and receipt of voice-based communication signals to and from cellular telephones, often referred to as mobile units or wireless units which may actually be stationary or fixed. Each cell site handles voice communications over a particular region called a cell, and the overall coverage area for the cellular telephone system is defined by the union of cells for all of the cell sites, where the coverage areas for nearby cell sites overlap to some degree to ensure (if possible) contiguous communications coverage within the outer boundaries of the system's coverage area.

When active, a wireless unit receives forward-link signals from and transmits reverse-link signals to (at least) one cell site or base station. Each active wireless unit is assigned a forward link channel on which it receives its forward link signals and a reverse link channel on which it transmits its reverse link signals. There are many different schemes for defining wireless channels for a cellular telephone system, including TDMA (time-division multiple access), FDMA (frequency-division multiple access), and CDMA (code-division multiple access) schemes. In CDMA communications, the baseband data sent between the base station and the wireless unit is multiplied by a spreading sequence, such as a pseudo-noise (PN) code which is a binary sequence that appears random but can be reproduced by the intended receiving station or unit. As such, different wireless channels are distinguished by different spreading sequences that are used to encode different voice-based streams, which may then be modulated at one or more different carrier frequencies for simultaneous transmission. A receiver can recover a particular voice-based stream from a received signal using the appropriate spreading sequence to decode the received signal.

Due to the delay-intolerant nature of voice communication, wireless units in conventional cellular systems transmit and receive over circuit switched links between a wireless unit and a base station as part of a circuit switched path between the wireless unit and another device, such as a landline telephone. A circuit switched path is a dedicated communications path established between the wireless unit and another device and has a relatively fixed amount of bandwidth. Since the paths are dedicated to the users with a relatively continuous throughput, there is no noticeable delay in transmission. Thus, voice-based systems rely on dedicated circuit switched links to provide continuous streams with fairly uniform bit rates to prevent unacceptable quality of service.

In the context communications between the wireless unit and the base station, a circuit switched link is a dedicated communications path established between the wireless unit and the base station. A circuit switched link also has a relatively fixed amount of bandwidth and can be a portion of a circuit switched path between the wireless unit and another device. While the wireless unit is using the circuit switched link, no other wireless unit can use that link. The circuit switched link is maintained for the duration of the call, and although the wireless unit can hand-off to other base stations, a circuit switched link (a dedicated wireless channel) is maintained between the wireless unit and the base station to service the call. Generally, each active wireless unit requires the assignment of a circuit switched link on the forward link and a circuit switched link on the reverse link.

Traditional data applications are typically bursty and, unlike voice communications, relatively delay tolerant. A block of data is sent followed by inactivity, and so long as the data is not corrupted, a short delay, for example on the order of seconds, may be acceptable. As such, circuit switching or using circuit switched links to transmit data is an inefficient use of network resources. Data transmission relies on packet switching to more efficiently use network resources. Packet switching networks, such as frame relay, asynchronous transfer mode (ATM), and Internet Protocol (IP), share network resources rather than dedicating network resources to a particular user. For example, the packet switching network can use a single packet switched path to forward packets of data from different users over the packet switching network. A data packet ("packet") is a finite set of data having a predefined protocol and organization. The packet is forwarded over the packet switching network based on a unique address contained in the packet header to deliver the packet message in the body of the data packet. As such, data packets with different destinations can share the same packet switched path.

Wireless communication systems are evolving from conventional voice systems to provide a wide range of wireless applications. For example, some cellular communication systems, such as those conforming to the IS-95B standard or wideband CDMA standards, such as the CDMA2000 and the WCDMA standards, or TDMA Packet Data standards currently being developed, will support wireless units that transmit and receive signals other than just voice-based signals. To provide efficient wireless data communications with packet data networks, wireless communications systems take advantage of the inherently bursty and delay-tolerant nature of the data traffic to more efficiently use wireless resources, such as wireless channels. Accordingly, next generation cellular systems will use packet switched links between wireless units and base stations to establish packet switched connections with a packet data network (PDN), such as the Internet, using packet data services, such as World Wide Web (the Web).

FIG. 1 shows a general block diagram of a wireless communication system 100 with access to a public switched telephone network 102 (PSTN) and a packet data network 104. The wireless system comprises a set of interconnected mobile switching centers (MSCs) 106, each supporting a number of cell sites 108. A wireless unit 110 can establish a voice call using a circuit switched link between the wireless unit and the base station as part of the circuit switched path with another device, such as a wireless unit 110 or a landline terminal in the PSTN 102. For example, a circuit switched link can be on a wireless channel, such as a forward traffic channel, between the wireless unit 110 and the base station 108. If the wireless unit is making a voice call, a circuit switched link is established for the forward link and the reverse link between the wireless unit 110 and the and the base station 108. In current cellular CDMA systems, a forward fundamental code channel is established on the forward link between the cell site 108 and the wireless unit 110, and a reverse fundamental code channel is established on the reverse link. A fundamental channel (circuit switched link) is maintained throughout the duration of the call and can carry voice, circuit switched data and/or packet data. The selection and distribution unit (SDU) 111 routes the high priority voice traffic from the circuit switched link to the MSC 106.

The wireless units 110 communicate with packet data networks 104 by establishing packet switched connections over the wireless network with the PDN 104. Multiple packet switched connections share wireless network resources to establish a packet switched path between the wireless units 110 and the PDN 104. A packet switched link is established between the wireless units 110 and the base station 108 by a burst management system which coordinates the sharing of available wireless resources, such as wireless channels, among multiple packet switched connections. In current cellular CDMA systems, the fundamental channel and/or one or more supplemental channels can be temporarily assigned to packet switched connections to form the packet switched link. The selection and distribution unit (SDU) 111 routes the lower priority packet data traffic from the packet switched link to a data interworking function (IWF) 112. The IWF 112 provides the interface between the wireless system and the PDN 104, such as the Internet.

For transmission of packet data in the wireless unit 110 to PDN 104 direction over the packet switched link, the wireless unit 110 requests wireless resources, such as supplemental code channels, to support the packet switched connection. For transmission of packet data in the PDN 104 to wireless unit 110 direction, the IWF 112 makes the requests for wireless resources for the packet switched connection. The burst management system collates the burst requests and temporarily assigns the available wireless resources to the packet switched connection. The burst management system uses reported or measured radio environment information to make decisions on the burst allocation strategy, burst size and duration. In doing so, the burst management system takes advantage of the delay-tolerant nature of data to more efficiently use the wireless resources and/or to ensure that sufficient wireless resources remain to handle the higher priority voice traffic. After the temporary allocation of the wireless resources lapses, the packet switched connection must again make a request for wireless resources to be able to transmit packet data.

For the wireless unit 110 to communicate with a device in the PDN 104, a series of rules exists that enable the wireless network and the device on the PDN to understand each other. These rules are called protocols. Because of the large amount of issues which must be resolved for the communications between devices to take place, layered protocols are used which divide the resolution of these issues between layers in the protocol. Each layer operates independently to resolve certain issues to enable the communication between the devices. At the lowest layer is the physical layer which comprises a physical medium(s) between the wireless unit 110 the device in the PDN 104, such as wireless channels, twisted pair, optical cables, and/or coaxial cables. On the physical layer, the information signals simply take the form of bits. Error correction of the communications signals sent over the physical medium is handled by the link layer, such as point-to point protocol (PPP), asynchronous transfer mode (ATM), and frame relay, which group the information sent over the physical layer into frames. To format addresses for the information being transmitted and ensure the information proceeds to the proper destination, a network layer, such as Internet Protocol (IP) is used for routing of data packets. A transport layer, such as transport control protocol (TCP), is used to establish a data session between two devices and to determine if data packets are lost in transit. The transport layer provides also provides recovery from a broken transport or data session. In data communications, the transport layer is performed at the endpoints of the communications, and the information from the endpoint devices is passed down to the lower layers for transmission. Each layer interfaces with the layer immediately below it, and the layer below perform a service to the layers above it. The interfaces between the layers is throughly defined, providing a specific format for the information sent between layers.

In the context of communications between the wireless unit 110 and the packet data network 104, additional issues, such as the transmission of data packets over the wireless channels, must be resolved. A radio link protocol resolves issues related to transmitting data packets over the wireless channels. When a wireless unit 110 requests to make a packet data connection or call, a link layer connection, such as a PPP link, is created in the IWF 112. The link layer connection can be controlled using the PPP Link Control Protocol (LCP), such as defined in Internet Engineering Task Force (IETF) Request for Comment (RFC) 1661. The link layer manages the flow of data leaving the transmitting device and performs error correction for the data packets at the receiving device. As such, the link layer connection acts as the interface for the wireless unit between the wireless communications system and the PDN 104.

Packet data communication on the Internet is dominated by traffic transported using TCP/IP in which data is transmitted using data sessions, referred to as TCP sessions or connections, in a request/response fashion. Before the wireless unit 110 can establish a data session, the link layer connection must be established. Once the link layer connection is established, a requesting device, such as the wireless unit 110, can attempt to establish a TCP session with a responding device, such as a web server on the PDN 104. For example, when a user requests a web page containing embedded images, a number of TCP sessions will typically be required to transmit information between the wireless unit 110 and the web page server using TCP/IP. In typical current usage, all of these TCP sessions must be set up or established before data or information can transmitted. Further background information on TCP/IP can be found in W. R. Stevens, *TCP/IP Illustrated*, Vol. 1 (Addison-Wesley, 1994).

FIG. 2 shows packets being exchanged over a TCP session initiated by a user. The bold arrows indicate data transfer while thin arrows show synchronization or acknowledgment packets. The TCP session is established with a three-way handshake between the user, such as the wireless unit 110, and the network device, such as a server, as will be described below. To set up the TCP session initiated by a user, the user sends a request to the network device to open a TCP session with the network device. The initial requesting packet does not contain data other than information in the header used in establishing the TCP session, such as a sequence number and a synchronization (SYN) flag which is set to indicate that the TCP session is in the process of being synchronized.

The network device responds by sending a response packet to acknowledge the initial request from the client. In responding to the initial request from the user, the network device sets an acknowledgment (ACK) flag in the header of the response packet, adds one to the sequence number from the user, and puts the modified sequence number into an acknowledgment field of the response packet. The SYN flag is set to indicate that synchronization is not yet complete. When the user receives the response packet from the network device, the user acknowledges the network device's response with an acknowledgment packet. In acknowledging the response packet, the user adds one to the network device's sequence number and puts that sequence number in an acknowledgment field of the acknowledgment packet. The user sets the ACK flag, but the SYN flag is no longer set. After this three-way handshake, the network device and the user continue to acknowledge each other's transmissions, but data can now be transmitted.

The round trip time (RTT) for setting up the TCP session is the amount of time required to send the request packet and receive the response packet. Because TCP session setup is typically associated with every TCP session, frequent TCP setup and tear-down or disconnect can adversely effect the data throughput. For relatively small request-response type packets, the packet switched connection must still request resources and be allocated them, and further data cannot be sent until the data session is set up. When the TCP session is associated with wireless communications, the RTT increases due to the delay associated with sending the setup packets for the data session over the packet switched link between the wireless user 110 and the base station 108. The additional delay arises because the burst management system must receive requests for and temporarily allocate wireless resources to send and receive the setup packets over the packet switched link between the wireless user 110 and the base station 108. The increased RTT can throttle the throughput and data rate. For example, in the wireless environment where the TCP setup time can be 280 ms or more, the setup time may far exceed the data burst time. Such a result contributes to increased delay for most users and degrades the overall data rate and throughput of data communications through the wireless network.

SUMMARY OF THE INVENTION

The present invention involves a wireless communication system which uses a circuit switched link between a wireless unit and a base station to establish a data session with a network device in a packet data network. After the data session is established, the data session can proceed using a packet switched link between the wireless unit and the base station. By using the circuit switched link to send data session setup packets, the system avoids the delay associated with requesting and being allocated wireless resources in sending the setup packets over the packet switched link between the wireless unit and the base station. Decreasing the delay associated with setting up the data session improves the data rate and throughput between the wireless communications system and the packet data network. For example, in an exemplary CDMA system, a circuit switched link is established to carry primary traffic (such as voice) and secondary traffic. The setup packets for the data session can be directly sent as secondary traffic on the circuit switched link, thereby avoiding the delay associated with sending the setup packets over a packet switched link. In this way, the round trip time (RTT) associated with setting up the data session can be reduced to improve the overall data rate and throughput through the wireless network to the packet data network.

BRIEF DESCRIPTION OF THE DRAWINGS

Other aspects and advantages of the present invention may become apparent upon reading the following detailed description and upon reference to the drawings in which:

FIGS. 5a–f show other example traffic frames which could be sent over a circuit switched link carrying data session setup packets according to the principles of the present invention.

DETAILED DESCRIPTION

For pedagogic purposes, the invention is described with respect to an exemplary embodiments of a wireless communications system which provides access to both packet data and voice networks. The data session setup system improves data throughput and performance between a wireless unit and packet data network, such as the Internet, by using a circuit switched link between a wireless unit and a base station to provide setup information for a data session with the packet data network, thereby reducing the setup time associated with sending the setup information over a packet switched link. After the data session is established, the data session uses the packet switched link. Thus, in accordance with aspects of the present invention, data packets used in establishing a data session are not treated as the packet data sent during the data session over the packet switched link. Instead, the setup packets for the data session are sent over an established circuit switched link to setup the data session. The data packets for the established data session can proceed over the packet switched link, subject to the delays of burst management.

If TCP/IP is used as the transport protocol for the packet data network, TCP setup or round trip time (RTT) is associated with every TCP session. When the TCP session is associated with a wireless architecture, the delay associated with burst management due to sending the setup packets over a packet switched path coupled with the frequent setups required can reduce the throughput and data rate between the wireless unit and the PDN. For example, using the packet switched link to send the setup packets, which have relatively small amounts of data, can reduce the effective data rate due to the time required for sending the setup packets over the packet switched link.

Figure 1:
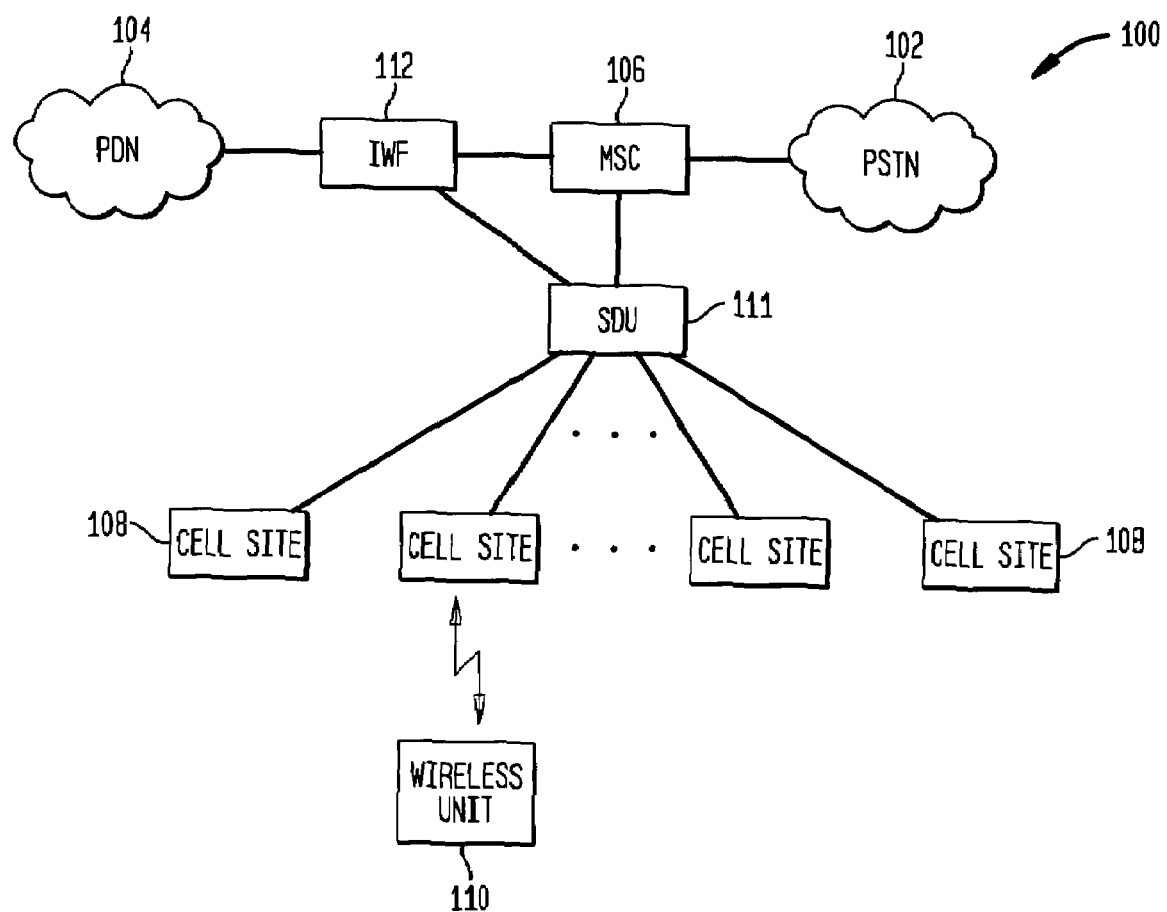
FIG. 1 shows a general block diagram of a wireless communications system with access to the public switched telephone network (PSTN) and a packet data network (PDN)
Figure 2:
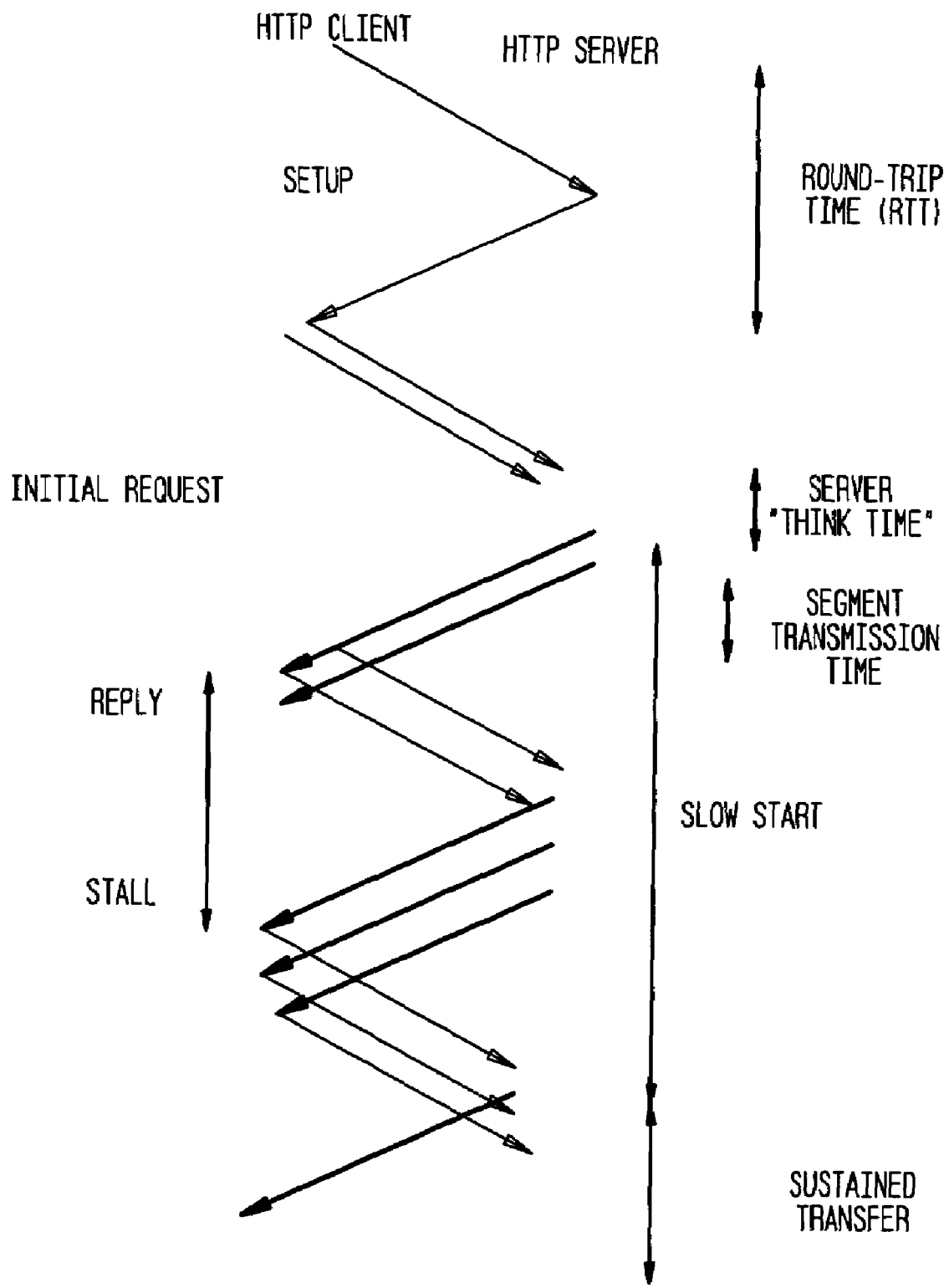
FIG. 2 shows data packets being exchanged in a TCP session.
Figure 3:
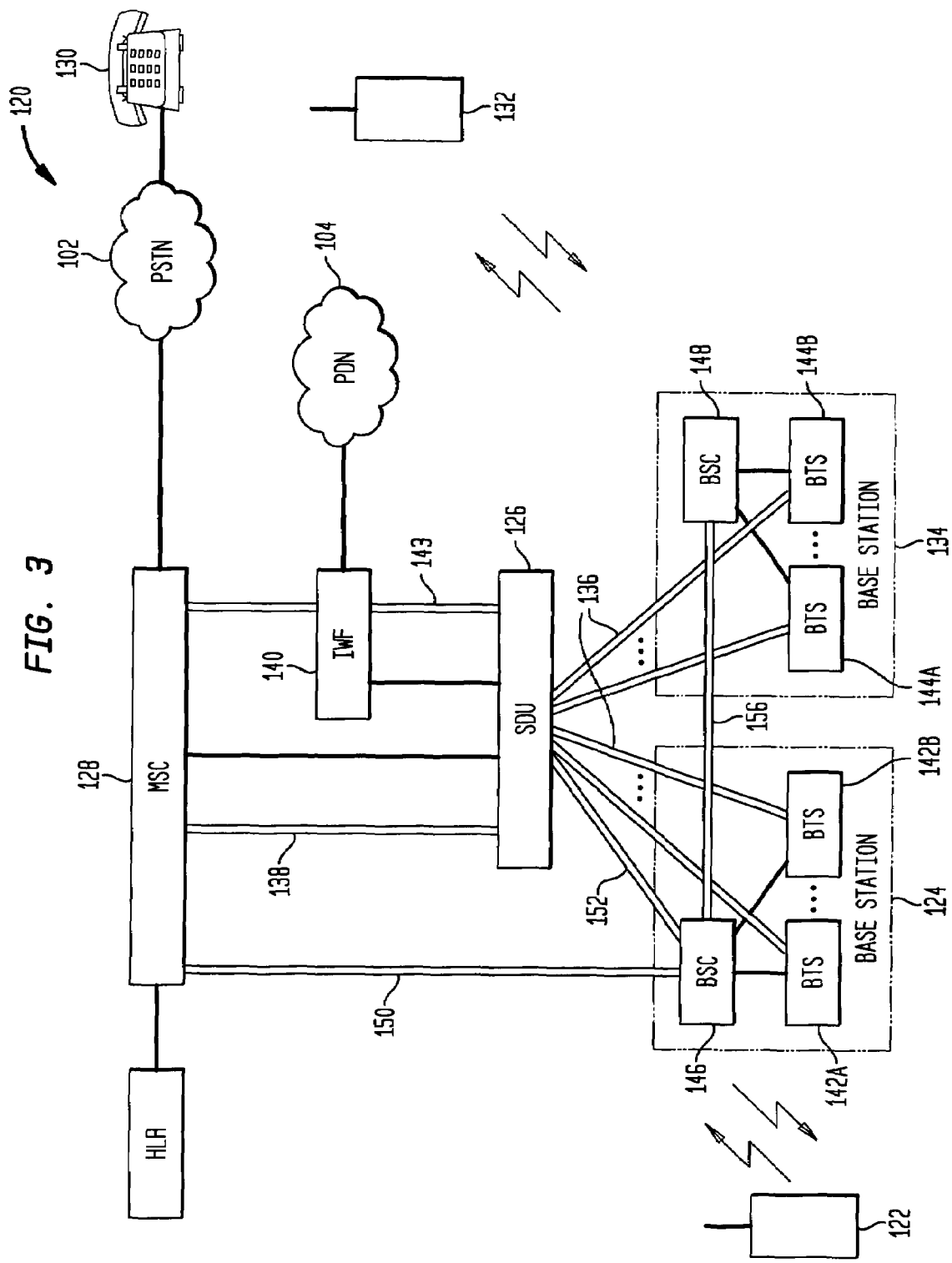
FIG. 3 shows a wireless system in which the data session setup system according to the principles of the present invention is used.
Figure 4A:
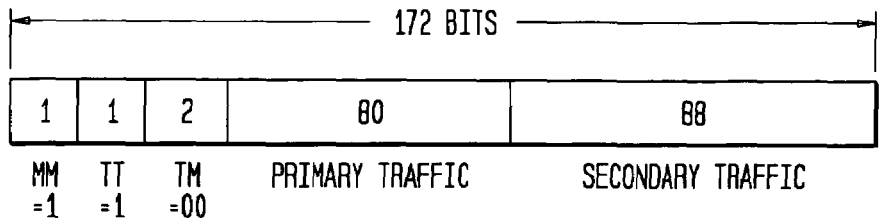
FIGS. 4a–d show example traffic frames which could be sent over a circuit switched link carrying data session setup packets according to the principles of the present invention.
Figure 4B:
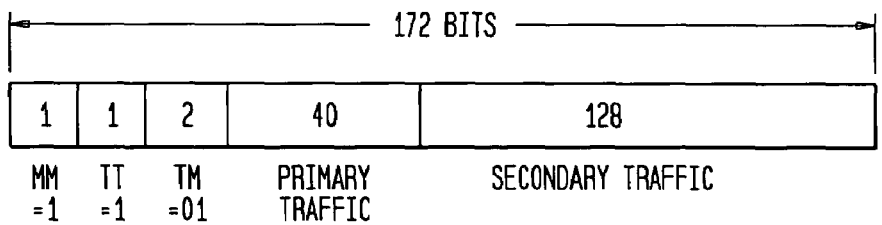
Figure 4C:
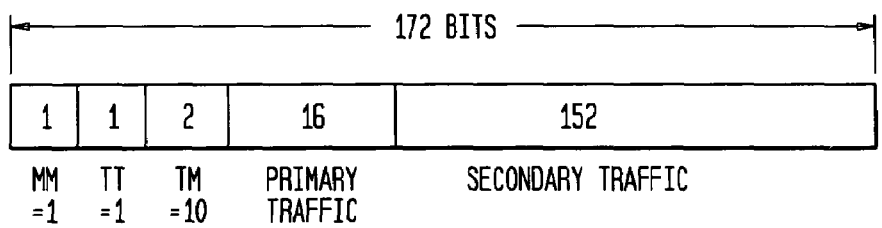
Figure 4D:
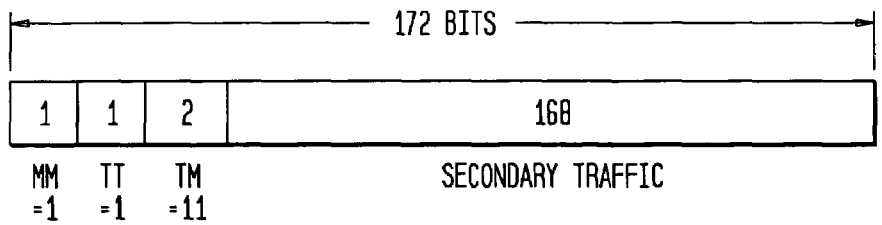

FIG. 3 shows a wireless network architecture 120, such as an IS-634 architecture, which is a cellular communications network having access to the PSTN 102 and the PDN 104, such as the Internet. The network architecture 120 can support simultaneous voice and packet switched data connections. For example, a circuit switched path carrying voice traffic can be established between a wireless unit 122 and a landline unit 130, through a base station 124, Selection and Distribution Unit (SDU) 126, the MSC 128 and PSTN 102. Alternatively, a circuit switched path can be established between the wireless unit 122 and a wireless unit 132, through the base station 124, the SDU 126, the MSC 128, and the base station 134. As part of the circuit switched path, a circuit switched link is established between the wireless unit 122 and the base station 124. A packet switched link between the wireless unit 122 and the base station 124 can use the same and/or different wireless channel(s) used for the circuit switched link between the wireless unit 122 and the base station 124 to support a packet data connection between the wireless unit 122 and the device on the PDN 104. The packet switched link is part of a packet switched path between the wireless unit 122 and a device on the PDN 126 through the base station 124, the IWF 140 to the PDN 104. Multiple wireless units can share wireless channels and other system resources to support multiple packet switched connections over the packet switched path to the device in the PDN 104.

At the base station 124, the burst management system temporarily assigns wireless resources for transporting packet data bursts of a packet switched connection between the base station 124 and the wireless unit 122. The wireless resources can include a wireless channel(s) being used as an already-established circuit switched link to the base station 124. Alternatively, the wireless resources for the packet switched connection can be other wireless channel(s) which are temporarily assigned and established between the wireless unit 122 and the base station 124. The burst management system can occur at other centralized locations, such as the SDU 126 or the MSC 128 or distributed among different locations in the architecture 120, such as the base station 124, the SDU 126 and/or the MSC 128. In general, the burst management system is responsible for assignments and resource usage for packet data connections over the packet switched link between the wireless units and the base station and for coordinating the resources allocated to the different base stations.

A fundamental code channel(s) (circuit switched link) can be established initially and used in sending data packets in a packet data session. In fact, the burst management system may temporarily allocate the fundamental channels to establish the data session, but in that instance, the circuit switched link is being used as part of a packet switched link in that the packet switched connection must request and be allocated the wireless resources to send the data packets. As such, the data session setup packets are treated the same as the packet data sent during the data session, which are typically delayed by the burst management system. The delay can be further increased by the time required to establish the portion of the packet switched link supporting the packet switched connection, for example establishing a set of temporarily assigned supplemental channels. By treating the data session setup packets differently than the data packets sent during the data session, for example as higher priority, delay intolerant traffic, the data rate and throughput of the system can be improved. In doing so, the setup packets for the data session can be sent over the circuit switched link to setup the data session, and the data packets for the established data session can proceed over the packet switched path, subject to the delays of burst management.

If the wireless unit 122 has established a voice circuit, the data session setup time can be reduced by sending the data setup information, for example the TCP setup packets, as secondary traffic over the already established circuit switched link in the voice circuit frames. As such, the delay associated with requesting and being allocated wireless resources to setup a data session is reduced. Although little data is carried in the synchronization or acknowledgment (setup) packets, the packets are required before any further packet data communications can be performed in the data session. Rather than allowing such packets to be delayed a disproportionate amount of time relative to their size, these types of packets can be sent directly over a circuit switched link with little effect on the quality of service (QOS) of the information on the circuit switched link if the setup packets are being multiplexed with other information on the circuit switched link.

Portions of the data session setup system can be implemented at the wireless unit 122 and the SDU 126 to insert/extract data session setup packets into the circuit switched link to avoid the burst management system which implements the packet switched link on wireless resources. At the wireless unit 122, the data session setup system can determine whether a data packet is for setting up a data session. If the wireless unit 122 is receiving the data packets, the wireless unit 122 can examine certain flags or bits in the data packet and/or the received traffic frame on the circuit switched link from the base station 124 to determine whether the data packets are for setting up a data session. If the data packets are for data session setup, the wireless unit 122 can extract the setup packets from the circuit switched link. If the wireless unit 122 is transmitting the data packet, the wireless unit 122 can examine certain flags and/or bits of the data packet indicating that the packet is for data session setup and/or set certain flags and/or bits of the data packet and/or the traffic frame to indicate the packet is for data session setup to be transmitted to the base station 124. The wireless unit 122 then directly inserts the setup packet into the circuit switched link to the base station 124.

At the SDU 126, the data session setup system also determines whether a data packet is for setting up a data session. If the SDU 126 is to send the data packets to the wireless unit 122, the SDU 126 can examine certain bits and/or flags associated with the data packet and/or traffic frame. If the data packet is for data session set up, the SDU 126 can set certain flags and/or bits associated with the data packet and/or traffic frame and directly forward the data packet to the base station 124 for transmission over the circuit switched link dedicated to the wireless unit 122. If the SDU receives a data packet from the circuit switched link dedicated to the wireless unit 122, the SDU 126 can examine certain flags and/or bits of the data packet and/or traffic frame to determine if the data packet is for data session setup. If so, the SDU 126 extracts the data packet from the circuit switched path for forwarding to the PDN 104. In alternative embodiments, portions of the data session setup system can be distributed throughout the wireless network or handled at a centralized location.

In this embodiment, a wireless unit 122 is initially assigned a forward circuit switched link (forward fundamental code channel) as part of a forward circuit switched path and a reverse circuit switched link (reverse fundamental code channel) as part of a reverse circuit switched path. Typically, the fundamental code channels will carry voice traffic, but these established circuit switched links can be used to send the data session setup packets. A packet switched connection can request the temporary assignment of wireless resources, including the fundamental code channels and supplemental channels to achieve higher transmission rates. The duration of such a burst of supplemental channels is determined by the burst management system. The maximum number of supplemental channels and the duration that may be allocated for a burst at any time depends on the availability of radio resources, the transmit power, the set of RF path losses between the wireless unit 122 and the cell sites 124, and the number of contending data users. If, at the end of a burst, a node still has data backlogged, it may request burst continuation (i.e., a reassignment of supplemental channels). It may be preferable to limit burst continuation in order to facilitate fair sharing of resources among multiple nodes, safeguard from power and interference overload, and reduce packet delay and blocking. The available RF resources and the individual needs will change dynamically in this environment. Data users with different priority levels and different quality of service (QOS) requirements may be handled differently by the burst management system. They may be given priority in initial assignment and continuations, as well as higher bandwidth assigned.

Current cellular communications systems provide the ability to simultaneously send primary traffic, such as voice, and secondary traffic, such as data, by multiplexing the primary and secondary traffic on the circuit switched link, for example in traffic frames over the fundamental channel. In current CDMA systems, the traffic frame is a 20 ms long interval on the fundamental channel carrying information between the wireless unit and the base station. For example, a traffic frame in the American National Standard ANSI J-STD-008 for CDMA can carry secondary traffic for multiplex option 1 & 2. FIGS. 4a–4d respectively show various formats for transmitting secondary traffic in a CDMA traffic frame for multiplex option 1 in which a bit rate of 9.6 kilobits per second is used in both dim and burst and blank and burst modes. Dim and burst in this context describes a frame in which primary traffic is multiplexed with secondary or secondary and signaling traffic. Blank and burst in this context involves the pre-emption of the primary traffic in a traffic frame with secondary traffic. FIGS. 5a–5f respectively show various formats for transmitting secondary traffic in a CDMA traffic frame for multiplex option 2 in which a bit rate of 14.4 kilobits per second and 7.2 kilobits per second is used in dim and burst and blank and burst modes.

Where simultaneous voice and data is not supported, a circuit switched link can be established between the wireless unit 122 and the base station 124. If a circuit switched link needs to be established, an initial wireless link setup time is required. As such, once the circuit switched link is established which is to support a packet data connection, the circuit switched link can last throughout the duration of the packet data connection (for example, while the PPP link is established). The data session setup system can ensure that data session setup packets are carried over the circuit switched link. The circuit switched link can carry a portion of the packet data in addition to the setup packets for the packet data connection. As such, the data session setup system can determine or be made aware that the circuit switched link is to carry data packets of a packet data connection, and the data session setup system determines which data packets are for data session setup to ensure that the setup packets avoid a packet switched link.

In certain embodiments, when the data packet carrying-capacity of the circuit switched link is exceeded, the excess data packets for the packet data connection are sent over the packet switched link, but data session set up packets are directed to the circuit switched link. In the other applications, for example in a wireless network architecture using TDMA and supporting packet data, a burst management scheme can dynamically assign wireless resources, such as time slots at different frequencies, to a packet switched connection based on system load and radio environment. Moreover, a circuit switched link, such as a fundamental channel, dedicated slot or multiplexed portion of a time slot, can be used to send setup packets for the data sessions on the packet switched connection. After determining that data packets for a packet data connection are on the circuit switched path, the data session setup packets are routed to the IWF 140.

In this embodiment, the SDU 126 processes the traffic frames on the circuit switched path to and from the base station 124 and implements the multiplex options shown in FIGS. 4a–d and FIGS. 5a–f. As such, in this particular embodiment, the SDU 126 would be responsible for implementing a portion of the data session setup system by determining that setup packets for a data session are being sent over the circuit switched path, for example by examining certain bits and/or flags in the traffic frame and/or data packet, such as the ACK and/or synch flags. In this embodiment, if the data packets are setup packets being sent to the PDN 104, the SDU 126 extracts from the circuit switched path the data session setup packets from the traffic frames sent over the circuit switched link and sends the data packets to the IWF 140 (to the PDN 104). The SDU 126 can set certain flags and/or bits in the process. If the data packets are setup packets being sent to the wireless unit 122, the SDU 126 can insert the data session setup packets from the IWF 140 into the circuit switched path to the base station 124 (to be sent over the circuit switched link to the wireless unit 122). The SDU 126 can set certain flags and/or bits of the traffic frame and/or data packet in the process.

Portions of the data session setup system are implemented in the wireless unit 122 such that data packets for data session setup are transmitted/received on a circuit switched link. The wireless unit 122 determines whether data packets received on the forward circuit switched link are for data session setup and/or whether data packets to be transmitted over the reverse circuit switched link are for data session setup. The wireless unit 122 can make the determination by examining certain bits and/or flags in the data packets and/or received traffic frames on the circuit switched path. For data session setup packets to be transmitted, the wireless unit 122 should be programmed/wired to insert data session setup packets directly into the reverse circuit switched link. Data session setup packets could always be placed in a particular location reserved for data session setup packets on the circuit switched link. In alternative embodiments or in different architectures, the data session setup system could be implemented in different ways and/or in different locations, such as a centralized location in the base station 124, SDU 126, the IWF 140 or the MSC 128 or distributed among different locations within the system.

In the embodiment of FIG. 3, the SDU 126 is connected to base stations 124 and 134. The base station 124 includes base station transceivers (BTS) 142a–b, and the base station 134 includes the BTSs 144a–b. The BTSs 142a–b and 144a–b comprise the CDMA radio equipment. Each BTS 142a–b and 144a–b is connected to the SDU 126 over a transport interface 136 which carries traffic frames between the SDU 126 and the BTSs 142a–b and 144a–b, for example using ATM or other protocols, in the forward and reverse directions. In either direction, the transport interface 136 can carry information from the fundamental traffic channel (a circuit switched link), thereby the traffic interface 136 handles a portion of the circuit switched path for the wireless unit 122 between the base station 124 and the SDU 126. The traffic interface 136 also carries the information from temporarily allocated supplemental traffic channels (packet switched link). As such, the traffic interface 136 handles the portion of the packet switched path between the base station 124 and the SDU 126. The fundamental channel can also be temporarily allocated to carry secondary traffic as part of a packet switched link between the wireless unit 122 and the base station 124. Between the base station 124 and the SDU 126, Asynchronous Transfer Mode (ATM) virtual circuits can be used to carry information to/from the circuit switched links and the packet switched links.

The BTS 142 acts as a relay point between the SDU 126 and the mobile 122. The BTS 142 removes and processes the IS-634 header from each forward traffic frame and then passes on the information portion of the frame to the modem for transmission over the air. The BTS 142 also attaches an IS-634 header to each reverse traffic frame and passes it on to the SDU 126.

Each base station 124 and 134 also includes a base station controller (BSC) 146 and 148 respectively. The BSC 146 determines when to allow and how long to continue high rate packet data bursts based on current radio resource conditions. The BSC 146 extracts radio related information, such as pilot signal measurements, from access channel messages to facilitate traffic channel assignment. The remaining information is relayed to the MSC 128 via interface 150. Thus, in this embodiment, significant portions of the burst management system are implemented in the BSC 146.

The MSC 128 is responsible for implementing call and connection control which supports multiple services per wireless unit, including simultaneous voice and packet data calls. The MSC 128 is the center of all voice communication. Requests for voice can be divided into incoming and outgoing call/connection requests, referred to as wireless-terminated and wireless-originated calls respectively. For voice call origination, the MSC 128 triggers outgoing services for the call and interacts with the appropriate wireless network elements to invoke the services. The MSC routes the connection between the base station 124 currently serving the mobile unit 122 which originated the call to the proper frame selector on the SDU 126 through an ATM interface. For voice call termination, the MSC 128 associates a circuit assigned to an incoming connection by PSTN 102 to a frame selector on the SDU 126 and routes the connection between the SDU 126 and the current base station 124 through the ATM interface. For packet data, the wireless unit 122 must first originate a call to establish a PPP connection. After the PPP connection or link is established, a data session, such as a TCP session can be established over the wireless network. Mobile-terminated packet data calls or connections can also be used to support packet data applications. As such, the MSC 128 can be used to establish circuit switched paths between the wireless unit 122 and the SDU 126 which can be used by the data session setup system.

Figure 6:
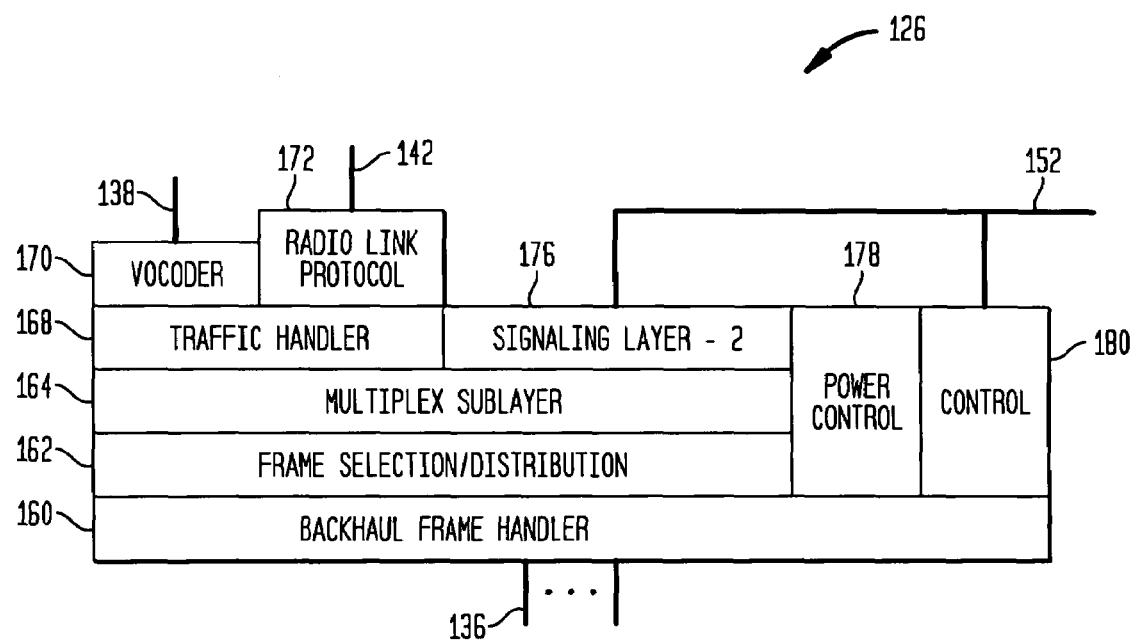
FIG. 6 shows the Selection and Distribution Unit (SDU) used in the system of FIG. 3.

The SDU 126 receives and processes the traffic frames and provides the voice traffic to the MSC 128 via the interface 138, and the data session setup information is transmitted as secondary traffic and provided to the IWF 140 via an interface 142. FIG. 6 shows an embodiment of a protocol stack for the SDU 126 for processing traffic frames. The backhaul frame handler 160 terminates the ATM interface 136 and performs traffic packet header processing. In the forward direction, a frame selection/distribution function 162 replicates the same forward frame to the BTSs 142a–b and 144a–b. In the reverse direction, the best reverse frame is chosen over the active transport interface connections based on reverse frame quality information. The multiplex sublayer 164 implements the various multiplex options. In this embodiment, the multiplex sublayer 164 could extract/insert the data session setup information into the circuit switched path as secondary traffic for use in setting up a data session, thereby avoiding having to request and wait for available resources to send data session setup packets 124 over the packet switched link between the wireless unit 122 and the base station 124.

A traffic handler 168 routes the voice traffic through a vocoder 170 to the MSC 128 via the interface 138, and routes the data packets through a radio link protocol layer 172 to the IWF 140 via the interface 142. The vocoder 170 processes the voice signals, and the radio link protocol 172 (RLP) processes the data packets to reduce errors in transmission. For example, RLP provides the mechanism for retransmission of data packets to ensure that the data packets are received correctly. Where simultaneous voice and data is supported, the multiplex layer 164 can extract/insert data session setup information into the voice circuit frame as secondary traffic, and the traffic handler 168 routes the data session setup information to/from the IWF 140 via the interface 142. The various functionality described for the SDU 126 can be compacted, expanded, altered and/or distributed to other locations in the architecture 120 depending on the implementation. For example, some or all functions of the SDU 126 could be performed in the MSC 128, the IWF 140 and/or the base stations 124 and 134. Moreover, functions described for other locations can be performed by the SDU 126 or other portions of the architecture 120. For example, certain burst management functions performed at the base stations 124 and 134 may be performed in the MSC 128 and/or the SDU 126.

The IWF 140 is the intermediary between the SDU 126 and the PDN 104 or the PSTN 102, but in this embodiment the IWF 140 is only considered for packet data services. The IWF 140 is connected to the PDN 104, such as the Internet, through a router (not shown), such as an Internet Protocol (IP) router. The IWF 140 can serve as a conduit for the packet switched connections to the PDN 104. The interface 143 can carry packet data streams between the IWF 140 and the SDU 126 on an ATM link or interface. Other interfaces are possible, such as E1/T1. The IWF 140 exchanges messages with the SDU 126 to control the flow of data between them, and the IWF 140 is responsible for assigning IP addresses. As such, in the TCP example, the TCP setup request packet(s) is provided to the PDN 104 from the IWF 140 after being multiplexed or extracted from the circuit switched path by the SDU 140. The response TCP set up packet(s) is provided to the IWF 140 from the PDN 104, and when the SDU 126 determines that the packets of data are for setting up a data session, the SDU 126 multiplexes or inserts the TCP setup packet(s) into the appropriate circuit switched path between the SDU 126 and the wireless unit 122. After the data session is established over the circuit switched path between the wireless unit 122 and the SDU 126, data packets for the data session can be carried for the packet switched connection over a packet switched path between the wireless unit 122 and the IWF 140.

When a wireless unit 122 requests a packet switched connection over the wireless network between the wireless unit 122 and the PDN 104 and attempts to register on the wireless network, a link layer connection, such as a PPP connection, is created in the IWF 140. The link layer connection can be controlled using the PPP Link Control Protocol (LCP), such as defined in Internet Engineering Task Force (IETF) Request for Comment (RFC) 1661. The link layer connection must be established before a TCP/IP session can be established. The TCP connection operates on the PPP connection.

In one embodiment, the link layer has two states: closed and opened. Under the opened state, there are two sub-states: active and dormant. The link layer connection of the IWF 140 is in the active state when the traffic connection to the SDU is signaled "on." If the traffic connection is "off," and the link layer connection is "opened," the link layer connection is in the dormant state. In the opened state the SDU 126 signals the IWF (or the link layer connection) to provide the status of the traffic connection from the IWF 140 to the SDU 126. When the SDU 126 is available to accept more packet data, it will send a "traffic connection on" message to the IWF 140. The IWF 140 will then forward the packets/frames in its buffer (not shown) to the SDU 126 until the IWF 140 receives a "traffic connection off" message from the SDU 126. After the IWF 140 receives the "traffic connection off" message, the link layer connection is still opened but labeled dormant. Data flow from the SDU 126 to the IWF 140 is not controlled in this embodiment. For closing the link layer connection, IWF 140 will close the link layer connection if instructed by the SDU 126. In addition, the IWF 140 initiates closure of the active link layer connection when it receives a termination request from the mobile unit 122. This occurs when the mobile unit 122 closes the PPP link gracefully before powering down for example.

In addition to the embodiments of FIGS. 3 and 6, the data session setup system according to the principles of the present invention can be used with different network architectures and/or protocols to perform the analogous functions when compared to the described system and configurations which omit and/or add components and/or use variations or portions of the described system. For example, the data session setup system is described with particular reference to a cellular network architecture using CDMA, but other network architecture using different multiple access techniques, such as TDMA can be used. Additionally, a specific embodiment has been described in which data session setup packets are routed over forward and reverse circuit switched links, but embodiments of the data session setup system can be used on the forward or reverse links and at different portions of the circuit switched path for a wireless unit. Moreover, the data session setup system is described with reference to a wireless unit originating a data session with a device on the PDN, but as would be understood by one of skill in the art with the benefit of this disclosure, an embodiment of the data session setup system can be used to setup a data session terminated at the wireless unit.

It should be understood that different notations, references and characterizations of the various architecture blocks can be used. For example, the data session setup system has been described within a particular network architecture configuration, but it should be understood that the data session setup system and portions thereof can be centralized or distributed throughout a wireless system and implemented in different locations to improve data rate and/or throughput. The data session setup system or portions thereof can be implemented in application specific integrated circuits, software-driven processing circuitry, firmware or other arrangements of discrete components as would be understood by one of ordinary skill in the art with the benefit of this disclosure. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

The invention claimed is:

1. A method of communicating between a wireless unit and a packet data network, comprising the steps of:
    establishing a circuit switched link between said wireless unit and a base station;
    multiplexing a setup packet with a traffic frame over said circuit switched link;
    sending said setup packet as secondary traffic over the established circuit switched link between said wireless unit and the base station to establish a data session between said wireless unit and said packet data network; and
    sending data packets for said data session over a packet switched link between said wireless unit and said packet data network on a wireless resource that has been temporarily allocated in response to a request for a wireless resource to send data packets for said data session.

2. The method of claim 1, wherein said step of multiplexing further includes:
    multiplexing said setup packet with a voice frame over said circuit switched link.

3. The method of claim 2, further comprising:
    maintaining said circuit switched link for at least the duration of a voice call on said circuit switched link.

4. The method of claim 1, further comprising:
    maintaining said circuit switched link for at least the duration of a link layer connection under said data session.

5. The method of claim 1, wherein said step of sending data packets further includes:
    using temporary assignments of supplemental channels as said wireless resource for sending said data packets for said data session.

6. The method of claim 1, wherein said step of sending data packets further includes:
    sending data packets for said data session on a reverse circuit switched link from said wireless unit to a base station.

7. The method of claim 1, wherein said step of sending data packets further includes:
    sending data packets for said data session on a forward circuit switched link from a base station to said wireless unit.

8. The method of claim 1, wherein said step of sending a setup packet further includes:
    sending, by said wireless unit, the setup packet over said already established circuit switched link to establish said data session.

9. The method of claim 1, wherein said step of sending a setup packet further includes:
    sending, by said base station, the setup packet over said already established circuit switched link to establish said data session.

10. The method of claim 1, wherein TCP/IP is used as the transport protocol for the packet data network and the setup packet is a TCP setup packet sent as secondary data traffic on one or more voice frames over the already established circuit switched link.

* * * * *